United States Patent [19]

Grassi

[11] Patent Number: 5,448,819
[45] Date of Patent: Sep. 12, 1995

[54] CORNER CLEANING MACHINE AND METHOD

[75] Inventor: Walter L. Grassi, Mississauga, Canada

[73] Assignee: Mecum Tooling Equipment Mfg. Ltd., Canada

[21] Appl. No.: 262,964

[22] Filed: Jun. 21, 1994

[30] Foreign Application Priority Data

Mar. 17, 1994 [CA] Canada ................................. 2119308

[51] Int. Cl.⁶ .......................... B23Q 5/22; B23C 3/12; B23D 1/00
[52] U.S. Cl. .................................. 29/558; 29/33 R; 409/132; 409/138; 409/304
[58] Field of Search ....................... 29/33 R, 558, 33 A; 409/132, 140, 138, 123, 131, 199, 200, 179, 259, 304, 293, 244

[56] References Cited

U.S. PATENT DOCUMENTS

| | | | |
|---|---|---|---|
| 3,091,156 | 5/1963 | Dickison | 409/140 |
| 4,043,081 | 8/1977 | DeTray | 51/129 |
| 4,541,466 | 9/1985 | Stegherr | 409/123 X |
| 4,659,265 | 4/1987 | Kishi et al. | 409/132 X |
| 4,822,219 | 4/1989 | Wood et al. | 409/137 |
| 4,907,919 | 3/1990 | Lee | 409/81 |

FOREIGN PATENT DOCUMENTS

| | | | |
|---|---|---|---|
| 832915 | 1/1970 | Canada | 18/103 |
| 955441 | 1/1974 | Canada | 90/1 |
| 1303809 | 5/1988 | Canada | 18/1209 |
| 3718149 | 12/1988 | Germany | 409/138 |
| 4006318 | 9/1990 | Germany | 409/138 |

*Primary Examiner*—William Briggs
*Attorney, Agent, or Firm*—Hayes, Soloway, Hennessey, Grossman & Hage

[57] ABSTRACT

An apparatus for cleaning the welded corners of an assembled window frame is provided. The apparatus has a work surface and a clamping device on the work surface for holding an assembled work piece on the work surface. A cutting tool is provided on the work surface for removing excess weld material from the work piece corner in a specific profile, the cutting tool moveable in an arcuate path around the apex of the corner of the assembled window frame whereby excess material is removed from the corner in a single pass of the cutting tool.

14 Claims, 3 Drawing Sheets

CORNER CLEANING MACHINE AND METHOD

The present invention relates to a machine to clean the welded corners of a window frame during manufacture of the window frame.

BACKGROUND OF THE INVENTION

The manufacture of a window frame, among other steps, includes the cutting and assembly of extruded frame or sash profiles with the appropriate glazing material to build an assembled window. The assembled window frame provides structural protection to the glazing for handling and transportation and provides the structure for the frame to be used in the construction process. During manufacture, the window frame may be provided with a variety of profiles and grooves to enhance the aesthetic appeal of the window frame.

Recent developments in window manufacturing have seen an increase in the use of plastic window frames, such as polyvinylchloride (PVC) or acrylic, for the frame and/or sash of the window. Typically, a vinyl window frame is assembled by cutting an extruded frame or sash profile to appropriate lengths and heat welding the cut profiles together around the perimeter of the glazing. The heat welding process adds plastic material to the weld joints (weld bead) which detracts from the aesthetic appeal of the window and may interfere with the conformity in size of separate assembled units. For example, it is necessary that the sash of window fits within the frame. Accordingly, it is necessary to remove the excess weld material from around the weld joints to provide a smooth joint. The removal of weld material from the outside surface of the window frame is called corner cleaning. Removal of weld material from the upper and lower surfaces of the window frame in combination with grooving the window frame joint is called shadow grooving. Shadow grooving is desirable to provide decorative enhancement of the joint and mask extrusion tolerances from batch to batch.

As window frames are manufactured and assembled in a series of manufacturing steps, it is desirable to have a machine that is efficient in the corner cleaning and shadow grooving steps of the manufacturing process. Specifically, a machine is required that enables rapid and accurate clamping of welded units to be cleaned and rapid and accurate removal of the excess weld material in order to reduce the time spent on the cleaning step of manufacture. A machine is also required that enables shadow grooving to be performed at the same time during the manufacturing process.

As well, it is desirable to provide a corner cleaning machine that enables rapid exchange of the cutting elements of the machine (cutter block) for cleaning different frame profiles. Rapid exchange of cutting elements reduces the set-up time of the machine which improves overall manufacturing efficiency.

There has also been a need for a machine with almost exclusively pneumatic logic controls in order to simplify operation of the machine, thereby reducing the manufacturing time and costs associated with window frame manufacture. Specifically, there has been a need for a machine where the clamping, cutting and shadow grooving operations are under pneumatic control. There has also been a need for a machine that enables the exchange of cutter blocks by pneumatic control.

In the past, there has also been a need for a machine where the movement of the cutting elements is through an arc to produce a smoother corner in order to provide a single pass method of removing excess weld material from the window frame corner.

There has also been a need for a machine with an effective clamping system for holding the work piece that ensures correct work piece alignment without the use of additional limit switches or holding devices.

In the past, single-spindle, single-position machines that have been developed to remove the excess weld material have been slow to operate and have required time consuming operations to both remove the excess weld material and to change cutters for cleaning different frame profiles.

Other machinery companies have developed a corner cleaning machine that removes the weld bead by a back and forth or side to side motion of the cutter block. Furthermore, these machine require the use of tools to exchange cutter blocks for different profiles.

SUMMARY OF THE INVENTION

In accordance with the invention, an apparatus for cleaning the corners of an assembled work piece is provided, the apparatus comprising:
 a work surface;
 clamping means on the work surface for holding an assembled work piece on the work surface;
 cutting means on the work surface for removing excess material from the work piece corner in a specific profile, the cutting means moveable in an arcuate path around the corner of the assembled work piece whereby excess material is removed from the corner in a single pass of the cutting means.

A further embodiment of the invention provides a horizontal clamping member, a vertical clamping member and a clamping fence, the horizontal clamping member for engagement with the inside surface of the work piece for biasing and securing the work piece against the clamping fence, the vertical damping member for biasing the work piece against the work surface.

Another embodiment of the invention, provides a support member pivotally connected to the work surface at a pivot point, the support member with a motor mounted distal to the pivot point, the motor with a profile cutter projecting above the work surface adjacent the work piece corner and a support arm drive means, the support arm drive means for pivoting the support member in an arcuate path along the work surface.

A still further embodiment of the invention provides for pneumatic activation of the clamping means and arcuate movement of the cutting means.

In another embodiment, the invention provides grooving means on the work surface for grooving the work piece. In a specific form, the grooving means includes grooving knives with a variety of configurations for removing weld material from the upper and lower surfaces of a clamped work piece, horizontal support members for supporting the grooving knives and a vertical support member for supporting the horizontal support members, the horizontal support members slidably engaged with the vertical support member, the vertical support member moveable along the work surface in response to pneumatic activation.

In still another embodiment, the cutting means further comprises pneumatic cutter exchange means for rapid exchange of the profile cutter. The cutter exchange means includes a locking spindle disposed within the shaft of the motor, the locking spindle biased to lockably engage the motor shaft to retain a profile cutter on the shaft of the motor, and pneumatic release means for selectively urging the locking spindle to a disengaged position to enable removal of the profile cutter from the motor shaft.

In a still further embodiment, the invention may include a vibration damping assembly on the support member.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
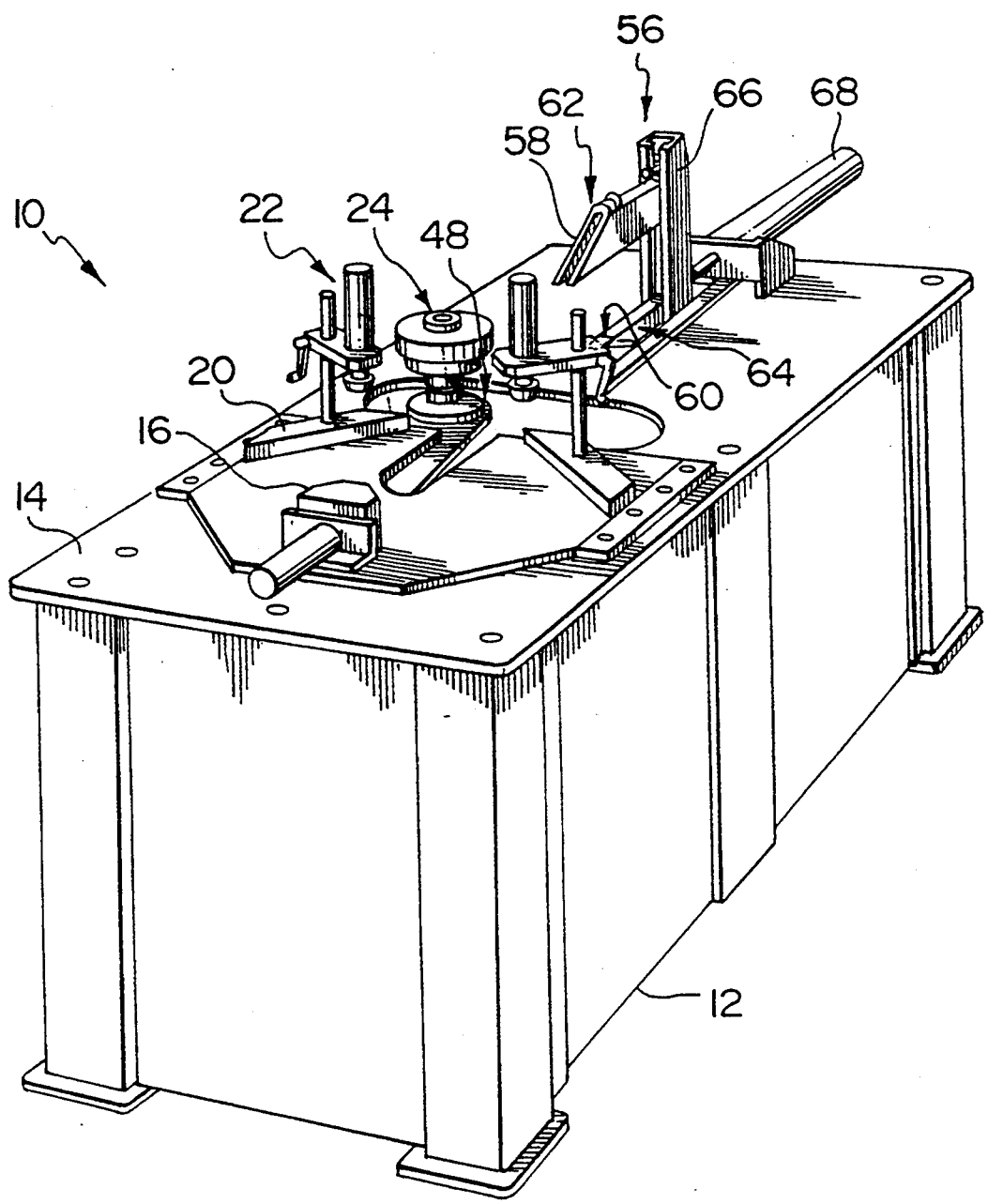
FIG. 1 is a perspective view of the corner cleaning machine.
Figure 2:
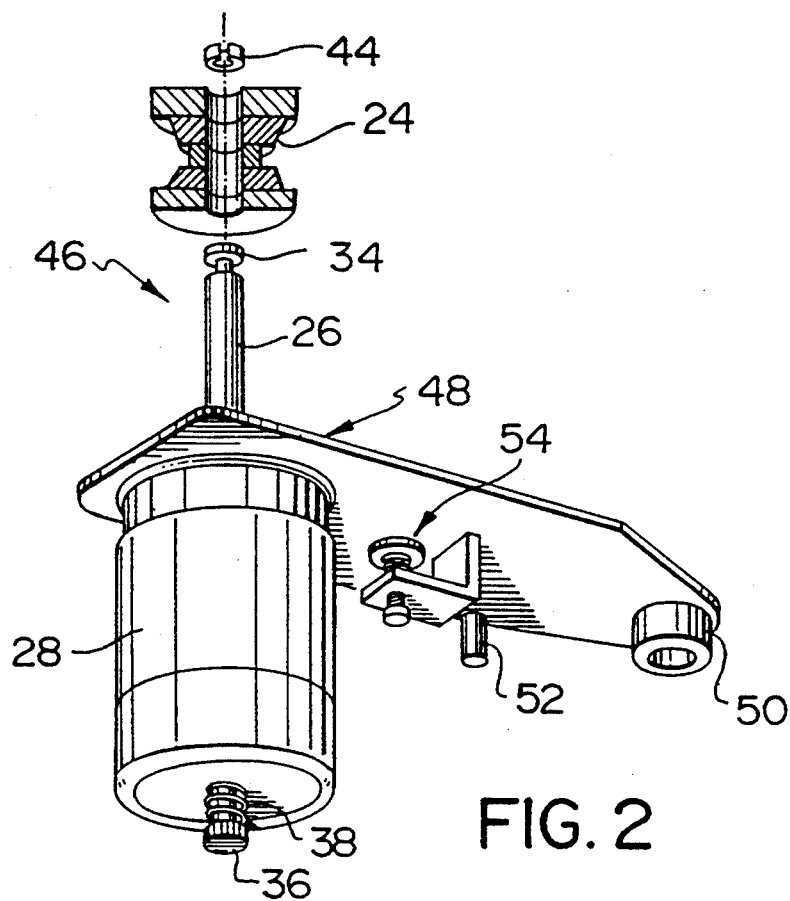
FIG. 2 is a perspective view of the motor assembly and support arm.
Figure 3:
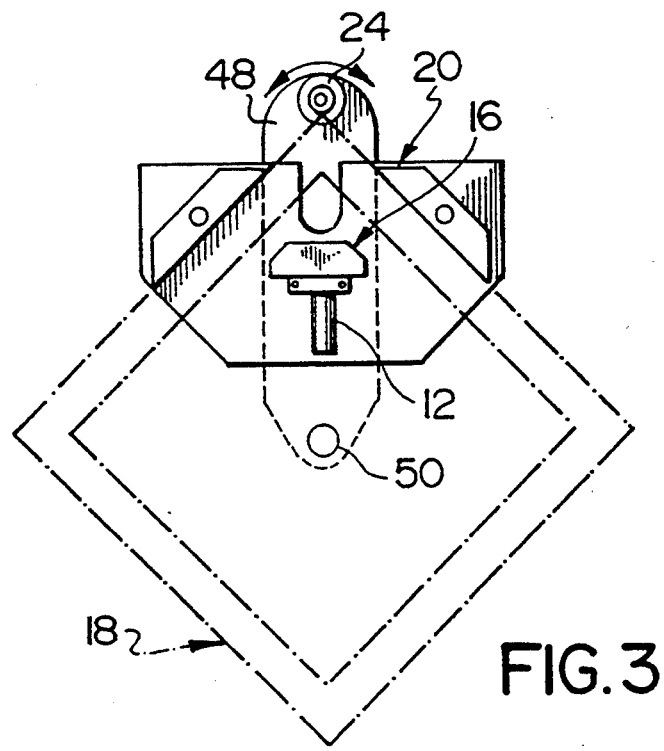
FIG. 3 is a schematic plan view of the corner cleaning machine with a work piece clamped on the work surface.

A corner cleaning machine 10 in accordance with the invention is shown in FIGS. 1-3. The machine is provided with a base 12 with a work surface 14. The work surface 14 is provided with a pneumatically activated horizontal clamping block 16 for clamping and holding an assembled work piece 18 against a fence 20. The work surface 14 is also provided with a pneumatically activated vertical clamping block 22 for clamping the work piece 18 against the work surface 14. The combination of the horizontal clamping block 16 and vertical clamping block 22 ensure that the work piece 18 is securely and accurately positioned on the work table 14.

Figure 2A:
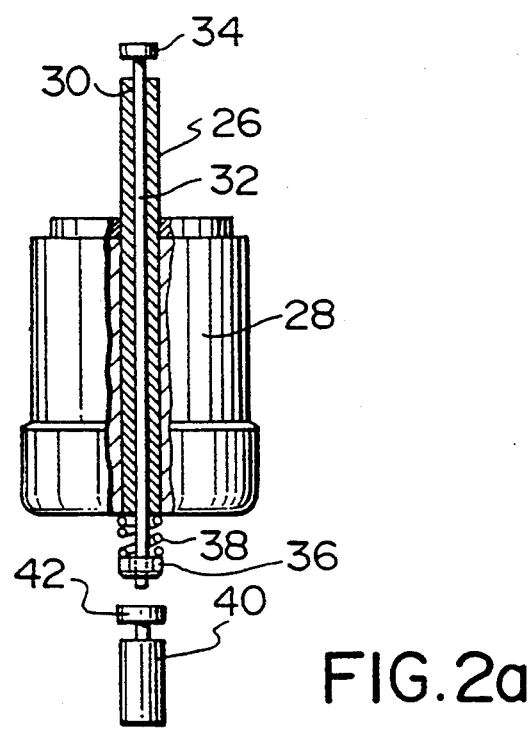
FIG. 2a is a cross-sectional view of the motor assembly and cutter release mechanism.

The corner cleaning machine 10 is also provided with a cutter block 24 for removing the weld bead on a specific frame profile. With reference to FIGS. 2 and 2a, the cutter block is mounted on a motor spindle 26 with motor 28. The spindle 26 has a bore 30 which receives locking spindle 32 with flange 34. The opposite end of the locking spindle 32 is provided with a flange 36. Disposed between the motor 28 and the flange 36 is locking spring 38 which urges flange 36 of locking spindle 32 away from motor 28. The locking spindle 32 may be moved within bore 30 by actuation of pneumatic cylinder 40 with pusher plate 42 to urge flange 36 towards motor 28. A cutter block 24 is positioned over spindle 26 and a locking key 44 is inserted underneath flange 34 to secure the cutter block 24 on spindle 26. Normal action of the locking spring 38 retains the locking key 44 on the spindle 26 thereby securing holding the cutter block 24 on the spindle 26.

Figure 4A:
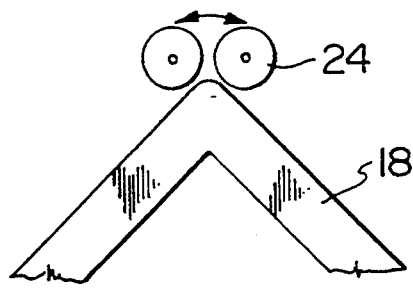
FIG. 4a is a schematic plan view of the corner cleaning machine showing the arcuate path of the cutter block.
Figure 4B:
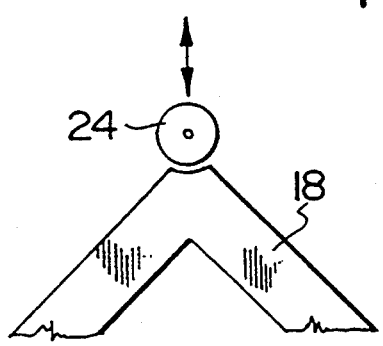
FIG. 4b is a schematic plan view of a prior an corner cleaning machine.
Figure 4C:
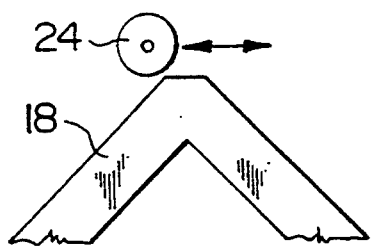
FIG. 4c is a schematic plan view of a prior an corner cleaning machine.

The motor assembly 46 is mounted on lower support arm 48 underneath work surface 14 on pivot bushing 50 with cutter block 24 projecting upwardly through the work surface 14 adjacent the corner of a clamped work piece 18 (FIG. 3). The support arm 48 may pivot in an arcuate path about pivot bushing 50 in response to pneumatic actuation of drive pin 52. Arcuate movement of the rotating cutter block 24 will remove excess weld material from the outside corner of the work piece 18 as shown in FIG. 4a. FIGS. 4b and 4c show the movement of a cutter block according to the prior art. The support arm 48 may also be provided with vibration damper assembly 54 to reduce vibration resulting from rotation of the cutter block 24. Preferably, the mating surfaces of the sliding components are lined with a non-metallic material to provide a self-lubricating operation.

Shadow grooving, for removal of excess weld material on the upper and lower surfaces of the work piece 18 is performed with shadow grooving assembly 56. Opposed grooving blades 58 and 60 are mounted on horizontal members 62 and 64 respectively with each horizontal member on vertical member 66. Each grooving knife 58 and 60 may be hardened and ground tool steel and may be pre-loaded by heavy duty die springs (not shown). Linear movement of the vertical member 66 is provided by pneumatic cylinder 68. The distance between grooving knives 58 and 60 may be adjusted by the operator for different groove depths or work piece thicknesses. Fine adjustment of the grooving knives 58 and 60 may be achieved by lockable thumb screw or other suitable locking means. Shadow grooving may be used to create a groove, a flush surface or ornamental profile depending on the height and shape of the grooving knives 58 and 60 used.

The invention may also be optionally provided a glazing leg drill for removal of material on the inside surfaces of the work piece corners. This operation may also be performed simultaneously with the cutter block action.

OPERATION

Four manufacturing steps for cleaning and shadow grooving work piece corners may be conducted on the machine including 1) clamping, 2) corner cleaning, 3) shadow grooving and 4) clamp release.

A plastic work piece 18 of an given size is placed on the work surface 14 between the fence 20 and horizontal clamping block 16 and underneath the vertical clamping blocks 22. The horizontal and vertical clamping blocks 16 and 22 arc actuated to firmly hold the work piece 18 against the fence 20 and work surface 14 respectively. Adjustment of the fence position can be made. The rotating cutter block 24 is put into motion in order that the cutter block moves in a side to side arc past the work piece corner such that the cutter block 24 removes excess weld material from the work piece corner 18. Upon removal or the weld material, the shadow grooving assembly 56 is put into motion in order to remove excess weld material from the upper and lower surfaces of the work piece 18 and optionally cut a groove at those corners. When shadow grooving is complete, the damp assembly is released and the entire procedure is repeated for each successive corner of the work piece 18. The entire process can be completed in the order of 7 seconds per corner.

The cutter stack 24 may be quickly exchanged by actuation of pneumatic cylinder 40 to release locking key 44. Removal of locking key 44 from the spindle 26 enables the removal and exchange of the cutting block 24 from spindle 26. It will be appreciated by those skilled in the art that different cutter stacks 24 may be used with the invention for different work pieces.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property of privilege is claimed are defined as follows:

1. An apparatus for cleaning the corners of an assembled work piece, the work piece having a corner with associated sides and apex, the apparatus comprising:
   a work surface;
   pneumatically actuated clamping means on the work surface for holding an assembled work piece on the work surface, the clamping means including a horizontal clamping member, a vertical clamping member and a clamping fence, the horizontal clamping member for engagement with the work piece for biasing and securing the work piece against the clamping fence, the vertical clamping member for biasing the work piece against the work surface;
   cutting means on the work surface for removing frame material from the work piece corner in a selected profile, the cutting means moveable in an arcuate path around the corner of the assembled work piece in response to pneumatic actuation to remove material from both sides and the apex of the corner in a single pass of the cutting means, the cutting means including a support member pivotally connected to the work surface at a pivot point, the support member with a motor mounted distal to the pivot point, the motor with a profile cutter projecting above the work surface adjacent the work piece corner and a support arm drive means, the support arm drive means for pivoting the support member in an arcuate path along the work surface.

2. An apparatus as in claim 1 further comprising grooving means on the work surface for grooving the work piece, the grooving means including
   grooving knives for removing weld material from the upper and lower surfaces of a clamped work piece and/or for grooving the upper and lower surfaces of the clamped work piece;
   horizontal support members for supporting the grooving knives;
   vertical support member for supporting the horizontal support members, the vertical support member slidably engaged with the work surface, the vertical support member moveable in response to pneumatic activation.

3. An apparatus as in claim 1 where the cutting means further comprises profile cutter exchange means for rapid exchange of the profile cutter, the profile cutter exchange means including:
   locking spindle disposed within the shaft of the motor, the locking spindle biased to lockably engage the motor shaft to retain a profile cutter on the shaft of the motor,
   pneumatic release means for selectively urging the locking spindle to a disengaged position to enable removal of the profile cutter from the motor shaft.

4. An apparatus for cleaning the corners of an assembled work piece, the work piece having a corner with associated sides and apex, comprising:
   a work surface;
   clamping means on the work surface for holding the work piece on the work surface, the clamping means including a horizontal clamping member, a vertical clamping member and a clamping fence, the horizontal clamping member for engagement with the work piece for biasing and securing the work piece against the clamping fence, the vertical clamping member for biasing the work piece against the work surface;
   cutting means on the work surface for removing frame material from the work piece corner in a selected profile, the cutting means moveable in an arcuate path around the corner of the assembled work piece to remove frame material from both sides of the corner and the apex of the corner in a single pass of the cutting means, the curing means including a support member pivotally connected to the work surface at a pivot point, the support member with a motor mounted distal to the pivot point, the motor with a profile cutter projecting above the work surface adjacent the work piece corner and a support arm drive means, the support arm drive means for pivoting the support member in an arcuate path along the work surface.

5. An apparatus as in claim 4 further comprising grooving means on the work surface for grooving the work piece.

6. An apparatus as in claim 5 wherein the grooving means comprises:
   grooving knives for removing weld material from the upper and lower surfaces of a clamped work piece and/or for grooving the upper and lower surfaces of the clamped work piece;
   horizontal support members for supporting the grooving knives;
   vertical support member for supporting the horizontal support members, the vertical support member slidably engaged with the work surface, the vertical support member moveable in response to pneumatic activation.

7. An apparatus as in claim 4 wherein the cutting means further comprises profile cutter exchange means, the profile cutter exchange means to enable rapid exchange of the profile cutter.

8. An apparatus as in claim 7 wherein the profile cutter exchange means includes:
   locking spindle disposed within the shaft of the motor, the locking spindle biased to lockably engage the motor shaft to retain a profile cutter on the shaft of the motor,
   pneumatic release means for selectively urging the locking spindle to a disengaged position to enable removal of the profile cutter from the motor shaft.

9. An apparatus as in claim 1 further comprising a vibration damping assembly on the support member.

10. An apparatus as in claim 6 wherein the clamping means and the arcuate movement of the cutting means are pneumatically activated.

11. An apparatus as in claim 6 where the cutting means further comprises profile cutter exchange means, the profile cutter exchange means to enable rapid exchange of the profile cutter.

12. An apparatus as in claim 11 where the profile cutter exchange means includes:
   locking spindle disposed within the shaft of the motor, the locking spindle biased to lockably engage the motor shaft to retain a profile cutter on the shaft of the motor, pneumatic release means for selectively urging the locking spindle to a disengaged position to enable removal of the profile cutter from the motor shaft.

13. An apparatus as in claim 12 further comprising a vibration damping assembly on the support member.

14. An apparatus as in claim 4 wherein the clamping means and the arcuate movement of the cutting means are pneumatically activated.

15. A method for cleaning and grooving the corner of a work piece, the work piece having a corner with associated sides and apex, comprising the steps of:
 a) clamping the work piece on a work surface;
 b) cleaning both sides of the work piece corner with a single pass of a cutting element moveable in an arc about the work piece corner;
 c) selectively grooving the upper and lower surfaces of the work piece corner;
 d) releasing the work piece from the work surface.

* * * * *

UNITED STATES PATENT AND TRADEMARK OFFICE
CERTIFICATE OF CORRECTION

PATENT NO. : 5,448,819
DATED : September 12, 1995
INVENTOR(S) : Walter Louis GRASSI It is certified that error appears in the above-indentified patent and that said Letters Patent is hereby corrected as shown below:

Claim 4, Col. 6, line 16, "curing" should be --cutting--.

Signed and Sealed this

Twenty-sixth Day of March, 1996

Attest:

BRUCE LEHMAN

Attesting Officer

Commissioner of Patents and Trademarks